United States Patent [19]

Stokes

[11] Patent Number: 4,636,644

[45] Date of Patent: Jan. 13, 1987

[54] ANTI-PARALLAX SCINTILLATOR SYSTEM FOR USE WITH PENETRATING IONIZING RADIATION

[75] Inventor: Jeffrey A. Stokes, San Diego, Calif.

[73] Assignee: IRT Corporation, San Diego, Calif.

[21] Appl. No.: 605,877

[22] Filed: May 1, 1984

[51] Int. Cl.⁴ .............................................. G01T 1/20
[52] U.S. Cl. ............................... 250/368; 250/361 R; 250/390
[58] Field of Search ............... 250/390, 368, 213 VT, 250/361 R, 363 R; 378/58, 99, 43

[56] References Cited

U.S. PATENT DOCUMENTS

| | | | |
|---|---|---|---|
| 2,532,644 | 12/1950 | Robinson | 378/58 |
| 2,796,532 | 6/1957 | Teague et al. | 250/213 VT |
| 2,902,604 | 9/1959 | Baldwin | 250/368 |
| 3,745,359 | 7/1973 | Martone | 250/369 |
| 3,790,785 | 2/1974 | Paolini et al. | 250/368 |
| 3,917,950 | 11/1975 | Carlson | 250/368 |
| 4,015,592 | 4/1977 | Bradley-Moore | 250/303 |
| 4,068,126 | 1/1978 | Wilson | 250/368 |
| 4,415,980 | 11/1983 | Buchanan | 378/58 |

OTHER PUBLICATIONS

"Californium-252 Neutron Radiography System, Model CF NR-10: Instruction & Operating Manuel", Tech. Manual No. OM-6155-8, San Diego, CA, 1977, pp. 36-41, 93-95, IRT Corp.

Berger, "Neutron Radiography: Methods, Capabilities, and Applications", N.Y., Elsevier, 1965, pp. 46-80.

Primary Examiner—Carolyn E. Fields
Attorney, Agent, or Firm—Jack L. Uretsky

[57] ABSTRACT

An anti-parallax scintillator system images light from a face of a scintillator radiated by penetrating ionizing radiation from a localized source. Radiation from the source will traverse the scintillator along rays forming a cone having its vertex approximately at the source. Scintillator light directed along each such ray is collected and redirected toward an aperture in a screen between the scintillator and the photocathode of an image intensifier. The aperture transmits the redirected light which is then incident upon the photocathode to form an image. Scintillator light not directed along rays from the vertex will miss the aperture and be blocked from the photocathode by the screen. A second embodiment, without an aperture, uses a plurality of mirrors arranged in a quasi-Newtonian configuration to provide anti-parallax imaging.

19 Claims, 7 Drawing Figures

ANTI-PARALLAX SCINTILLATOR SYSTEM FOR USE WITH PENETRATING IONIZING RADIATION

This invention relates generally to radiation detectors. More particularly, this invention relates to systems using scintillators for imaging penetrating ionizing radiation.

BACKGROUND OF THE INVENTION

Beams of penetrating ionizing radiation such as neutrons and x-rays or gamma rays are useful for nondestructive inspection of material and for medical diagnosis. In one mode of application, penetrating radiation is used to make a transmission image of an object in order to provide a projection of the object's internal structure onto an image plane. The image is made by irradiating the object with radiation from a substantially point source and positioning an imaging detector to detect and record the radiation transmitted through the object. The imaging detector thereby creates an image of the object's internal structure, as discussed, for example, in H. Berger, *Neutron Radiography: Methods, Capabilities, and Applications,* New York, Elsevier (1965) pp. 47–80, incorporated herein by reference.

Detection of penetrating radiation generally requires conversion of the energy carried by the penetrating particles, or quanta, into visible light. The light is recorded at the image plane of a detection system to form an image suitable for visual inspection or computer analysis. For example, one known form of detection system for X-rays includes an inorganic crystal made of NaI(Tl), CsI, or LiI optically coupled to an image intensifier. When an X-ray of relatively low energy enters the NaI crystal and is fully absorbed, an average of 43 visible photons/keV of X-ray energy is emitted. Some of the visible photons are captured by the photocathode of the image intensifier to give rise to photoelectrons. Electron multiplication occurs in the image intensifier, and the electrons produced in the image intensifier are directed onto a phosphor screen to produce a visible image.

An analysis of the detection process, applied to X-ray detection, is contained in H. H. Barrett, et al., *Radiological Imaging,* New York, Academic Press (1981) pp. 582–597, also incorporated herein by reference.

FIG. 1 illustrates a system, such as that just described, in operation. A penetrating particle or quantum, such as a neutron or an X-ray, is shown incident on a thick, optically homogeneous scintillator from the right of the figure. Absorption or scattering of the particle or quantum within the scintillator results in light emission from a small neighborhood, of the order of tens of microns, of the absorption or scattering event. A circular aperture having diameter d is provided with a lens and is placed a distance $s_o$ from a reference plane in the scintillator. The reference plane is parallel to the scintillator face and to the aperture boundary. The lens focuses light passing through the aperture upon a photocathode oriented parallel to the reference plane at a distance $s_1$ from the lens. The photocathode is placed at the focal point of light rays originating from the intersection of the lens axis and the reference plane. That intersection and the focal point thereby bear an optically conjugate relationship with respect to the lens in the FIG. 1, and the photocathode defines an image plane for the system.

The light generated in the scintillator along a single ray from the source does not, of course, all originate from the reference plane. Light originating from events at points off the reference plane will not be focused at the photocathode, because points off the reference plane are not optically conjugate, with respect to the lens in FIG. 1, to any points in the photocathode plane. Instead the light will be focused in front of or behind the photocathode as respectively indicated by the solid and dotted lines in FIG. 1. As a result the image of a ray in the scintillator is not a point but a spot having an approximate width $$w \approx t(d/s_o)[(s_o f) - 1]^{-1} \tag{1}$$

where t is the scintillator thickness, f the lens focal length, and the aperture diameter is small compared with the distance of the aperture from either the image plane or the photocathode. Accordingly, use of a thick scintillator causes loss of resolution by defocussing.

However, the absorption mean free path of radiation generally increases with increasing energy. Accordingly, the scintillator thickness must be increased as the energy of the incident radiation is increased in order to have an acceptable number of particles or X-ray quanta intercepted by the scintillator. Thus, on the one hand, a 2 mm thick single-crystalline plate of 96% enriched $^6$LiI(Eu) provides about 95% attenuation of a thermal neutron beam. On the other hand, a 2 cm thickness of typical organic scintillator will only provide about 40% attenuation of a 1 Mev neutron beam. A corresponding increase in absorption mean free path for hard X-rays compared with soft X-rays necessitates the use of thicker scintillators with increasing X-ray energy.

Use of thick scintillator screens, however, gives rise to an additional resolution problem stemming from parallax. The origin of the problem may be understood from FIG. 2 where the aperture and lens of FIG. 1 are replaced by a pinhole.

FIG. 2 shows a thick scintillator crystal having a rear face A'-A. A portion of the front face of the scintillator is viewed through a pinhole P by a photocathode Ph which may belong to an image intensifier. A source S having dimensions small compared with the distance from the source to the scintillator rear face A'-A irradiates the scintillator through its rear face with penetrating radiation. An object, indicated by the arrow X'-X, placed between the source and scintillator face, is radiated by the source S and imaged onto the photocathode, as symbolized by the image Y'-Y. Two rays S1-A and S2-A', having projections intersecting at an apex point V, define one projection of the conical envelope enclosing radiation from the source S that strikes the rear face A'-A of the scintillator. Accordingly, as illustrated in FIG. 2, the source may be used to provide a cone of radiation upon the scintillator rear face.

The ratio of source dimension to source-scintillator distance, and the source-object distance, are selected to provide no more than a pre-selected minimum geometric unsharpness, as explained in IRT Corporation, "Californium-252 Neutron Radiography System, Model CFNR-10: Instruction and Operating Manual," *Technical Manual No. OM*-6155-8, San Diego, Calif. (1977), incorporated herein by reference, pp. 36–41. The solid angle, centered on the source, intercepted by the scintillator is made large if it is necessary to maximize radiation intensity from the source onto the scintillator.

The parallax effect is illustrated in FIG. 2 by the line from the source intersecting the rear face of the scintillator at B and the front face of the scintillator at B'. As may be seen from the figure, the point B is focused by the pinhole upon the photocathode at a point C, and the point B' is focused by the pinhole upon the photocathode at a different point C'. Radiation from the source S passing through the crystal along the path B-B' will cause scintillations along some length of the path within the scintillator. The scintillations will cause an image to form along a corresponding portion of the path on the photocathode between the respective points C and C'. Radiation incident upon the scintillator at a single point may then be recorded upon the photocathode as a line having appreciable length. This effect is undesirable because in order to have high resolution, with correspondingly sharp images, it is necessary that each quantum of radiation passing through a given point in the object be recorded substantially as a single point.

SUMMARY OF THE INVENTION

It is accordingly one object of the present invention to provide for an anti-parallax method and apparatus for viewing a light emitting face of a scintillator used to detect highly penetrating ionizing radiation. The method and apparatus are adapted to be used with a substantially point source radiating conically with respect to the planar face, especially when the conical flux of radiation defines an appreciable solid angle at the vertex of the cone defined by the conical radiation flux.

One feature related to the present invention includes an optical system to focus each light ray passing through the scintillator from the direction of the vertex of the radiation cone upon a pinhole aperture. With respect to such optical system, therefore, the vertex of the cone and pinhole are optical conjugates. Another feature of the invention involves the replacement of the pinhole by a finite aperture and lens to achieve efficient light collection in a high resolution, high sensitivity detection system.

It is accordingly an object of the present invention to provide an anti-parallax system for imaging a face of the scintillator used to detect directed ionizing radiation from a source.

These and other objects, advantages, and features of the invention will become readily apparent from the following detailed description of the preferred embodiment, which is presented in conjunction with the accompanying drawings.

DETAILED DESCRIPTION OF A PREFERRED EMBODIMENT

Figure 3:
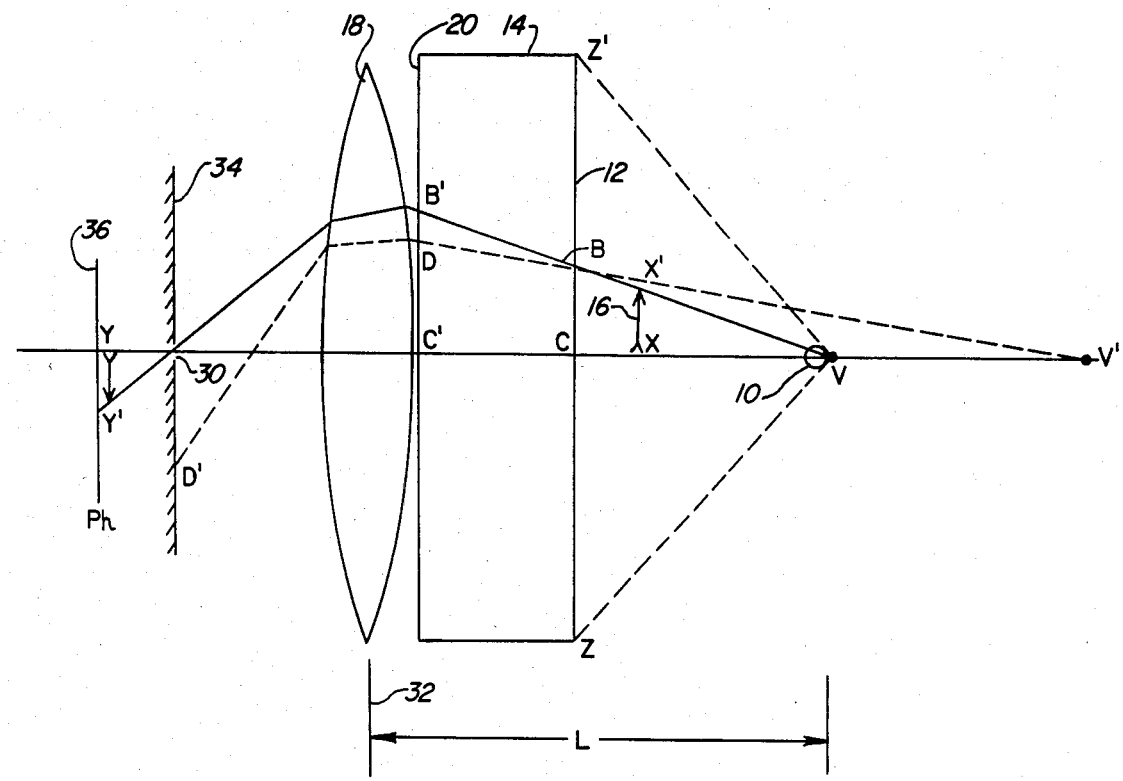
FIG. 3 is an idealized schematic illustration of an exemplary anti-parallax scintillator system incorporating principles of the present invention and utilizing a lens.

As illustrated in FIG. 3, a source 10 of penetrating ionizing radiation radiates a rear face 12 of a scintillator 14. It is immaterial for the purposes of the present invention whether the scintillator is a single large crystal, a liquid scintillator or other kind of scintillating material, provided that it is optically homogeneous. An object 16 which is to be imaged, represented by an arrow having a tip X' and a base X, is placed between the source 10 and the scintillator 14.

Radiation from the source outlining the object 16 is exemplified by the rays B-B' and C-C' passing through the scintillator from the source 10. The dimensions of the source 10, the source-scintillator distance, and the source-object distance are selected to provide an acceptable geometric unsharpness, as explained in Technical Manual OM 6155-8. The source 10 and scintillator front face 12 define a cone having vertex V which may be considered as the position of an equivalent point source of the ionizing radiation radiating the face Z-Z'. Accordingly, the lines B-B' and C-C' intersect at the equivalent source point V.

The source 10 will generally have small dimensions resulting from the method of producing the penetrating radiation, as for example, an encapsulated radioactive isotope, an aperture in a source of intense X-rays such as an electron accelerator, or the charged particle impact area on a target in such an accelerator.

A double convex lens 18 is positioned in front of the face 20, which is the viewing face, of the scintillator 14. Light rays appearing to originate from the point V such as the rays B-B' and C-C' will be focused at a point 30 determined by the focal length of the lens 18 and the distance L between the vertex point V and the principal plane 32 of the lens 18. An opaque screen 34 is in the lens' focal plane with an idealized pinhole aperture at the image point 30 of the vertex V. A photocathode 36 of an image intensifier is located at a distance behind the screen 34 to provide suitable magnification for the pinhole optical system exemplified in the Figure.

Figure 1:
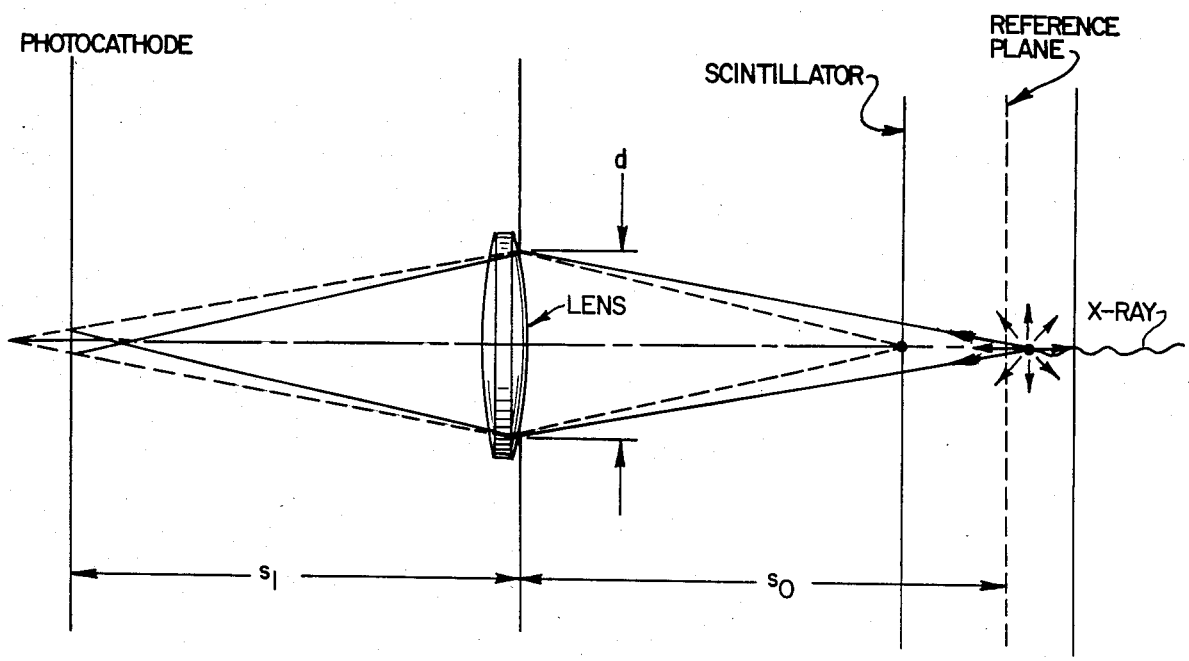
FIG. 1 illustrates schematically a prior art imaging system for use with penetrating ionizing radiation.
Figure 2:
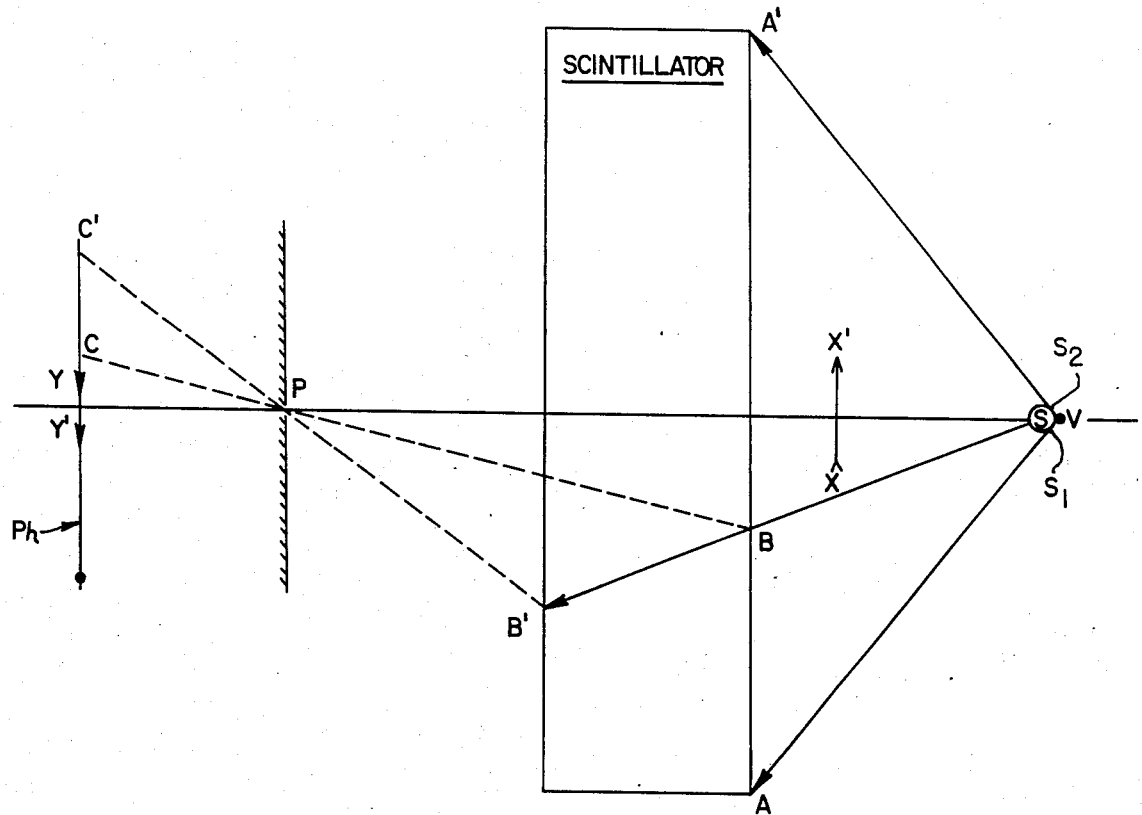
FIG. 2 illustrates the parallax effect resulting from the use of thick scintillators in the prior art.

It may be appreciated from FIG. 3 that the lens 18, positioned as shown, substantially eliminates the parallax illustrated in FIG. 2. As is evident, the only light rays from the track B-B' of the penetrating ionizing radiation that can enter the pinhole and strike the photocathode are those traveling along the direction of the track. A light ray leaving the track B-B' in a different direction, indicated in the figure by B-D, will appear to have originated from a point V' different from V along the symmetry axis of the lens 18 and pinhole 30. Accordingly, the ray V'-B-D will not be imaged at the point 30 of the pinhole. It will instead strike the screen 34 at a different point D' where it will be blocked from the photocathode 36.

FIG. 3 therefore illustrates an anti-parallax system for imaging light from a viewing face of a scintillator used to detect directed ionizing radiation from a source. The source is sized and positioned with respect to the scintillator to provide no more than a preselected minimum unsharpness, the relative positions defining an equivalent source point. The system comprises: viewing means amplifying spatial intensity variations in incident light and for displaying an image responsive to the intensity variations; aperture means for defining an aperture to transmit light emitted from the viewing face of the scintillator onto the viewing means, the aperture including an aperture reference point; and imaging means for focussing light traversing the scintillator face to make the equivalent point source and the aperture reference point optically conjugate to one another.

Figure 4:
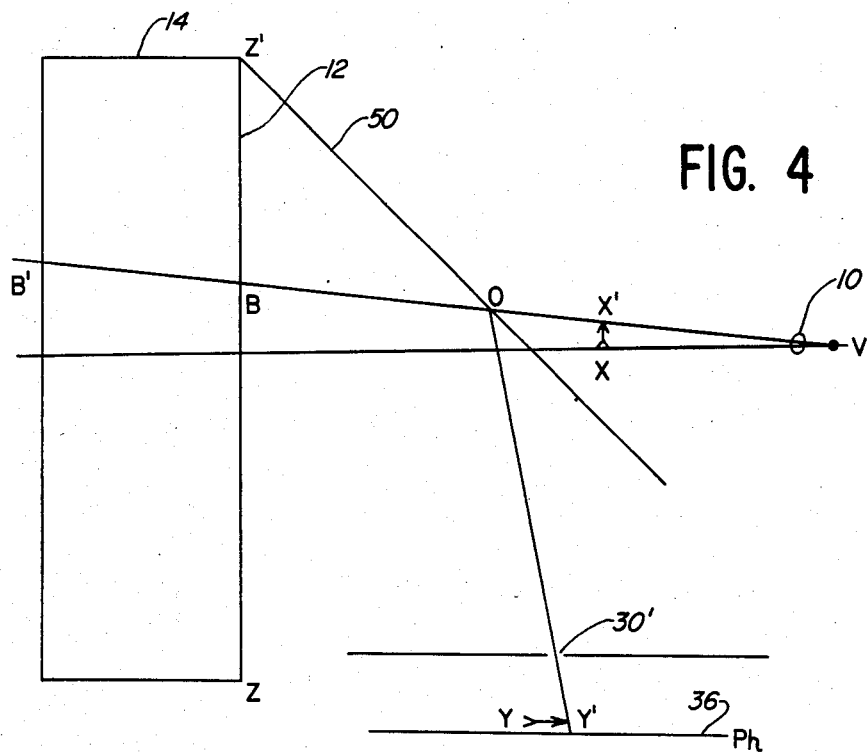
FIG. 4 is an idealized schematic illustration of an exemplary anti-parallax scintillator system incorporating principles of the present invention utilizing a mirror.

An embodiment exemplifying other principles derived from the present invention is illustrated in idealized form in FIG. 4. In this embodiment a mirror 50 is placed at an angle between the source 10 and scintillator 14. A pinhole aperture 30' is positioned to have its virtual image in the mirror coincide with the apex point V of the conical envelope encompassing the radiation incident on the rear face 12 of the scintillator. As a result of this positioning, every light ray entering the pinhole from the mirror must come from a single radial line from V, such as B'-B in FIG. 4. The points B' and B thereby have the same image, eliminating parallax. The mirror 50 is constructed of material having a large mean free path for the incident radiation. The mirror thickness is accordingly made less than about an order of magnitude smaller than the mean free path so as to avoid interfering appreciably with the radiation.

The anti-parallax feature of the present invention improves the resolution of an imaging system provided that the system resolution is parallax limited. The defocussing effect described by Eq. (1) does not come into play when the scintillator face is viewed through a pinhole aperture because the aperture diameter is zero for an idealized pinhole. There are, however, other resolution limiting effects that must be considered in a practical system.

As with other systems in the general class of scintillator-based radiation imaging devices, the optical systems shown in FIGS. 3 and 4 suffer a degradation in resolution at low flux levels due to quantum statistics. The degradation may be understood by reference to a typical configuration involving a photocathode 36 having a 45 mm input image diameter and a 30 line pair ("lp")/mm resolution (corresponding to a photocathode picture element—"pixel"—size of 1/60 mm, referred to the photocathode). The photocathode 36 must image substantially all of the front face 20 of the scintillator 14. Typically, the scintillator 14 will have facial dimensions of the order of tens of cm; the optics must therefore minify the scintillator image by a factor of order of magnitude 10. The distance of the photocathode from the pinhole 30 will typically be about 1/10 the distance of the pinhole from the face 20 and the corresponding pixel size at the scintillator face 20 is 1/6 mm. The pinhole dimension must be at least about the photocathode pixel size, or about 1/60 mm, in order to transmit the maximum amount of light without degrading the resolution.

The best spatial resolution possible with the described photocathode is obviously determined by the pixel size, namely, 1/6 mm at the scintillator face. In order to achieve this resolution, there must be sufficient contrast between adjacent pixels to overcome the effect of random noise. If the signals from two adjacent pixels are noisy, and the noise is uncorrelated from pixel to pixel, then the signal intensities from the two pixels will fluctuate in time independently of each other. Each signal will fluctuate about some average intensity characteristic of each respective pixel. As a result of the statistical fluctuations each pixel of a pair will, at various times, appear brighter than the other pixel if the two average intensities are insufficiently different. In fact, if the amplitude of the fluctuations is on the order of or larger than the difference between average intensities of the two pixels, then each pixel will appear to be momentarily brighter than the other one about half the time. Under these conditions, a sequence of momentary observations would not detect any contrast between the two adjacent pixels, and hence the two pixels would not be resolved. The pair of them, however, might be just distinguishable from the general background and thereby be detected as an unresolved anomaly of larger area than either by itself.

The minimum detectable intensity difference, or minimum detectable contrast, between adjacent pixels is a design parameter of the system and depends upon the desired use of the system. Harrison, et al., p. 376, remarks that a 4% contrast is about the limit of visual discrimination. Detection of 3% contrast is about the limit of present day neutron radiography, as discussed in *Technical Manual No. OM*-6155-8, pp. 93–95. Accordingly, 3% will be used in the following description for exemplary purposes.

In order to be detectable, the contrast between adjacent pixels must be of the order of twice the rms intensity fluctuation $\sigma$ of each pixel.

In most imaging situations, including the present one, $\sigma$ is governed by Poisson statistics and hence is given approximately by the square root of N, the average number of neutrons detected in each pixel during an observation period. Hence, for contrast c to be detectable, $$\Delta N = cN \geq 2\sigma = 2\sqrt{N} \tag{2}$$

or, $$N \geq 4/c^2 \tag{3}$$

The number $N_o$ of neutrons incident on a pixel is given by $$N_o = FtA \tag{4}$$

where F is the incident neutron flux, t is the observation time and A is the area of a pixel. N is related to $N_o$ by $$N = \eta N_o \tag{5}$$

where $\eta$ is the detection efficiency, that is, the probability of detecting an incident neutron. The incident flux required to resolve adjacent pixels with contrast c is accordingly $$F \approx 4/(\eta c^2 At) \tag{6}$$

For detection of thermal neutrons, as already mentioned, a 2 mm thick LiI scintillator will stop about 95% of the incident neutron beam. Each neutron captured in the scintillator will give rise to about $10^6$ optical photons.

Those light quanta that will be imaged at the photocathode 36 must be directed within about 20 or 30 mradians of the captured neutron track in order to be within the few tenths of a mm resolution distance at the scintillator 14 front face 20. That is, the relevant visual quanta must lie within about $10^{-4}$ of the $4\pi$ solid angle surrounding the track. Consequently, on the order of $10^2$ light quanta will be directed into the pinhole per stopping neutron.

Of course, the pinhole optics in the foregoing example will generally be unsatisfactory for practical use because a sufficiently small pinhole will also limit the resolution. For light of about 6000 A, and a pinhole diameter of 1/60 mm, the diffraction limited angular resolution of the pinhole may be calculated by reference, e.g., to Slater, J. C. and Frank, N. H., *Electromagnetism*, N.Y., McGraw-Hill (1947), p. 190, to be about 40 mradians. The desired angular resolution, on the other hand, is about $$30° \text{ (view angle)}/1350 \text{ (line pairs)} \approx 0.5 \text{ mradians} \qquad (7)$$

Figure 5:
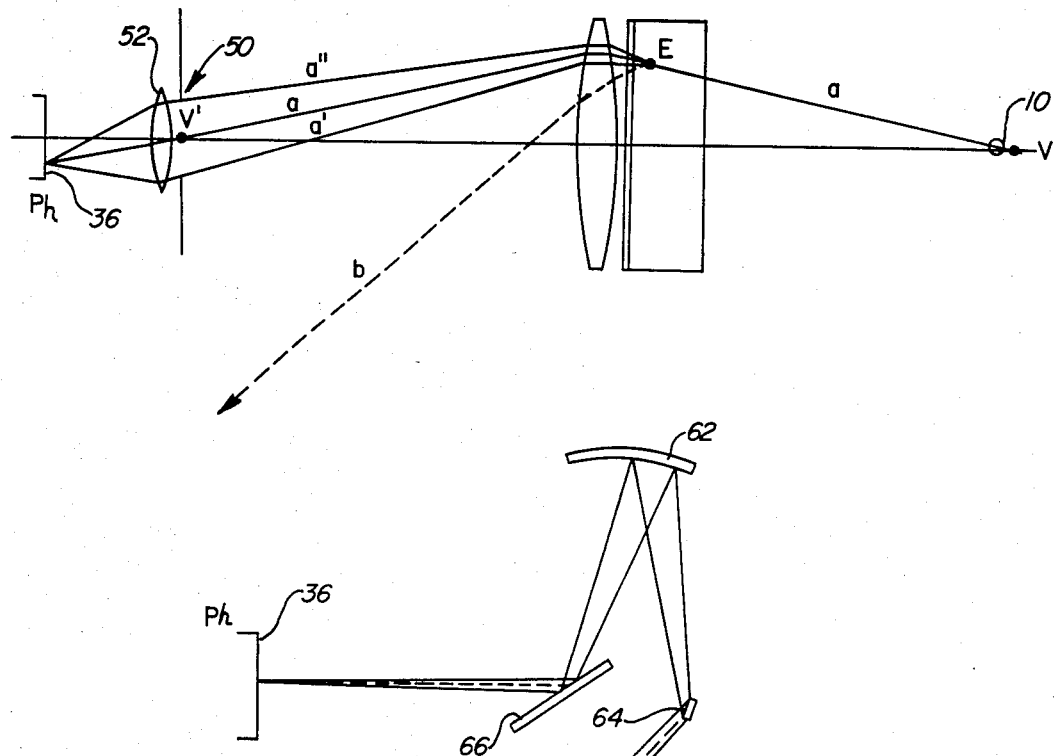
FIG. 5 is a schematic illustration of an exemplary thermal neutron imaging system suitable for use with the anti-parallax scintillator systems of FIGS. 3 or 4.

Thus, the viewing aperture must be more than about an order of magnitude larger than the photocathode pixel size to avoid diffraction limiting of the resolution. A practical system must therefore replace the pinhole by a viewing lens and a larger aperture, as shown in FIG. 5. In FIG. 5 a larger aperture 50 is centered on a point V', the point at which the penetrating radiation source would be imaged if it were a source of light located at point V. Ray a in FIG. 5 is a ray of hypothetical scintillator light following one possible trajectory from V to the image point at V'. Rays emanating from a scattering or absorption event at point E in the scintillator in directions lying close to that of a, e.g. a' and a'', will be admitted by the aperture at V'. Behind the aperture 50 a second lens 52 focuses the rays approximately to a point on the photocathode. A ray emanating from point E outside of the narrow cone around ray a, e.g. ray b, will be blocked by the aperture. All points in the scintillator lying along a ray emanating from the source S will be imaged by the two lenses so as to produce small, concentric light spots on the photocathode. The maximum aperture size and focal length, on the other hand, are limited by the defocussing effect described by Eq. (1), which determines the size of the light spots.

The performance of a practical scintillator imaging system is also affected by the quantum efficiency of the photocathode, that is, the probability of converting a visible incident photon to a photoelectron. That probability is typically about 10% for presently available photocathodes. Accordingly, an order of magnitude of 10 photons will be converted per neutron stopping in the scintillator in the described thermal neutron imaging systems. Because present day image intensifiers have nearly 100% quantum efficiency in the electron multiplication stage, nearly every converted electron will be detected. Accordingly, it may be seen that the detection efficiency of the system illustrated in FIG. 5 is essentially unity.

Referring back to Eq. (6), then, it may be seen that the requisite neutron flux for the described system, using about a 1 sec resolving time, is approximately $$F \approx 1.5 \times 10^7 \text{ neutrons/cm}^2\text{-sec} \qquad (8)$$

which is at about the upper limit of presently available thermal neutron fluxes.

The anti-parallax feature of the embodiment described herein also provides that light quanta from the (idealized) track of a single neutron will all be received by the same pixel of the photocathode. In contrast, in an equivalently sized prior art system such as is illustrated in FIG. 2, the apparent parallax displacement could be of the order of a mm on the scintillator face 20. Thus, the light quanta from a single neutron track will be distributed among several photocathode pixels. The number of light quanta per photocathode pixel from a single neutron will then be reduced to order of magnitude unity. In a realistic system, therefore, there is substantial likelihood that the efficiency factor $\eta$ in Eq. (5) and (6) will be less than unity. As a result, there will be a degradation in system performance as measured by the fluence Ft required to distinguish adjacent pixels with contrast c, as well as by the resolution.

Detection of fast neutrons presents additional difficulties because of their lower available fluxes and larger mean free paths. Thus, a 10 mg $Cf^{252}$ source would provide a flux of about $2 \times 10^5$ neutrons/cm$^2$-sec at a distance of about 1 m and with a mean energy of about 2.5 MeV. Such neutrons have a collision mean free path in Pilot F organic plastic scintillator, available from EMI-Nuclear Enterprises Ltd., Edinburgh, Scotland, of about 2 cm, and lose about one-half their energy in each collision. Approximately 6000 visible photons are emitted in each such collision.

By repeating the calculations made for thermal neutrons, it may be seen that in the embodiment of FIG. 3 an average of about 0.6 light quanta will be directed into the aperture 30 per neutron collision. About one-half the neutrons incident upon a 2 cm thick Pilot F scintillator will collide at least once in transversing the scintillator. Taking into account the 10% photocathode conversion efficiency, the efficiency factor in this case is given by $$\eta \approx 1 - \exp[-0.6 \times \tfrac{1}{2} \times 0.10] \approx 0.03 \qquad (9)$$

According to Eq. (6), the resolving time must therefore be of the order of an hour in order to have system performance approaching that of the thermal neutron system. This is a resolving time that compares favorably with resolving times required by known 10 mg $^{252}$Cf systems.

Figure 6:
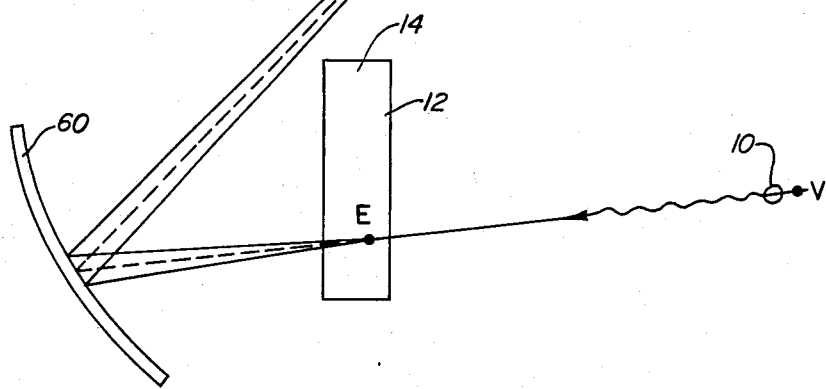
FIG. 6 is an idealized schematic illustration of an exemplary anti-parallax imaging system incorporating principles of the present invention utilizing mirrors arranged in a quasi-Newtonian arrangement.

FIG. 6 illustrates yet another embodiment which eliminates lenses and uses only mirrors in a configuration somewhat akin to that in a Newtonian telescope. In the quasi-Newtonian configuration illustrated in FIG. 6 the lenses 18 and 52 of FIG. 5 are replaced by the respective first and second concave mirrors 60, 62. A first small, plane mirror 64 is placed at the focal point of the first concave mirror 60. The first mirror 64 replaces the function of the aperture 50 in FIG. 5 in that mirror 60 only reflects light originating from a narrow cone at point E. The second concave mirror 62, having a short focal length comparable to that of the lens 50 in FIG. 5, focuses the light from the mirror 64 onto the photocathode 36. An optional second plane mirror 66 may be used to alter the light path from mirror 62 to permit convenient positioning of the photocathode 36. The replacement of lenses by mirrors in the embodiment of FIG. 6 can substantially eliminate chromatic aberration when that becomes an important consideration.

There are, in fact, many ways to configure the optical system in keeping with the principles of the present invention. Each lens depicted in the figures, for example, could be a set of lenses collectively manifesting the desired optical function, with each individual lens carefully selected and matched to the others for minimum chromatic and geometrical aberrations. Other combinations of mirrors and lenses than those specifically illustrated in the figures will also lie within the scope of the present invention when manifesting the same functions as those illustrated, or equivalent functions.

Figure 7:
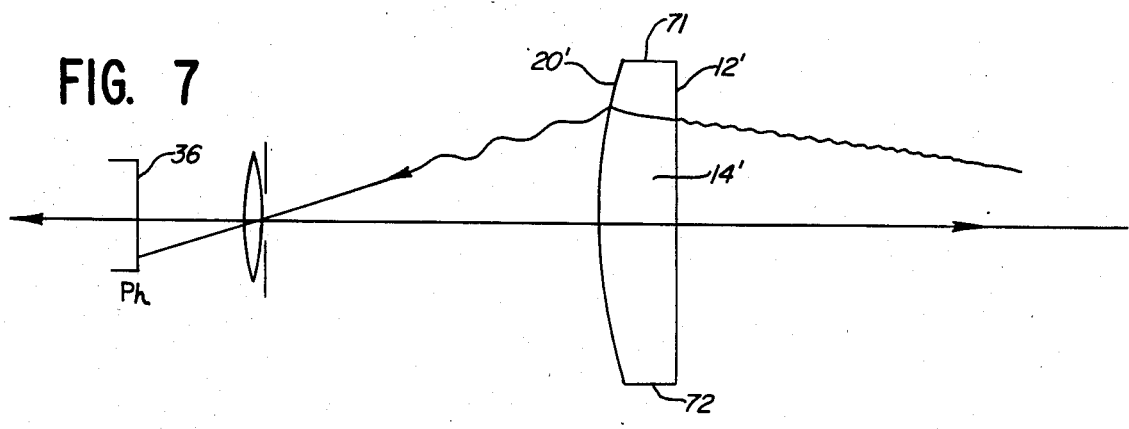
FIG. 7 is an idealized schematic illustration of an exemplary anti-parallax imaging system incorporating principles of the present invention utilizing an integrated lens.

In the integrated lens embodiment illustrated in FIG. 7, for example, at least one scintillator face 20' may be curved so that the scintillator 14' has the shape of a plano-convex lens with a plane face 12'. Accordingly, the scintillator 14 plus lens 18 configuration of FIG. 3 is now combined into the single unit 14'. The plane face 12' and the edges 71, 72 of the scintillator may be coated with an optically opaque, non-reflective coating to eliminate light rays reflected from the face 12' and the edges 71, 72 of the scintillator 14'. In a similar vein, the light emitting face 20' of the scintillator may be coated with an anti-reflective coating to reduce spurious signals. It is also not necessary to the invention that the face 20' be curved to form a convex lens; a fresnel lens configuration would also be satisfactory.

It will, of course, be understood that modification of the present invention in its various aspects will be apparent to those skilled in the art, some being apparent only after study and others being a matter of routine design. Further, the use of the particular components and component shapes described herein are not necessary features of the present invention. For example, other arrangements and combinations of lenses and mirrors than those specifically illustrated, having the effect of reducing parallax and increasing resolution, also fall within the scope of the present invention. Also, scintillators used in connection with the present invention need not be inorganic crystals; amorphous material such as Li-based scintillating glasses could be used as well. Accordingly, the scope of the invention should not be limited by the particular embodiment and specific construction herein described, but should be defined only by the appended claims and equivalents thereof.

What is claimed is:

1. A scintillator imaging system for imaging penetrating ionizing radiation from a source, comprising:
   scintillation means for providing light having a predetermined range of wave lengths in response to the radiation, said scintillation means having an irradiated surface, said source being sized and disposed to provide no more than a preselected minimum unsharpness and to radiate said surface conically, the vertex of the radiation flux cone defining an equivalent point source of radiation radiating said surface;
   imaging means for focussing said light from said scintillation means, said imaging means providing a focus point, said point source and said focus point being optically conjugate with each other respect to said imaging means;
   aperture means for defining an aperture at said focus point for transmitting the focussed light; and
   viewing means having an inherent best spatial resolution for receiving and intensifying the transmitted light, and for displaying an image responsive to said transmitted light, said aperture being sized with respect to said range of wave lengths to minimize diffraction degradation of said viewing means while also minimizing defocusing resulting from finite aperture size.

2. A scintillator imaging system according to claim 1 wherein said scintillation means includes an inorganic crystal.

3. A scintillator imaging system according to claim 2 wherein said inorganic crystal is one of NaI(Tl), CsI and LiI.

4. A scintillator imaging system according to claim 1 wherein said scintillation means includes an inorganic amorphous scintillator.

5. A scintillator imaging system according to claim 4 wherein said amorphous scintillator is a Li-based scintillating glass.

6. A scintillator imaging system according to claim 1 wherein said scintillation means includes Pilot F organic plastic scintillator material.

7. A scintillator imaging system according to claim 1 wherein said scintillation means includes a scintillator crystal having said irradiated surface, a viewing surface, and edges, and said viewing surface is coated with an anti-reflective coating.

8. A scintillator imaging system according to claim 7 wherein at least one of said irradiated surface and edges are provided with means for reducing spurious signals resulting from light reflections from said surface and edges within said scintillation means.

9. A scintillator imaging system according to claim 8 wherein said means for reducing spurious signals includes an optically opaque, non-reflective coating on at least one of said irradiated surface and edges.

10. A scintillator imaging system according to claim 1 wherein said imaging means includes a lens for focussing said light from said scintillation means at said focus point.

11. A scintillator imaging system according to claim 1 wherein said imaging means includes a mirror positioned to reflect said light from said scintillation means and said source point is located at the virtual image of said focus point in said mirror.

12. A scintillator imaging system according to claim 1 wherein said imaging means includes a viewing face of said scintillation means and said viewing face is shaped to focus said light from said scintillation means.

13. A scintillator imaging system according to claim 12 wherein said viewing face comprises a Fresnel lens.

14. A scintillator imaging system according to claim 1 wherein said scintillation means includes scintillator material provided with the shape of a plano-convex lens.

15. A scintillator imaging system according to claim 1 wherein said aperture means includes an opaque screen having an aperture containing a lens positioned at said focus point.

16. A scintillator imaging system according to claim 1 wherein said viewing means includes an image intensifier having a photocathode.

17. A scintillator imaging system in accordance with claim 16 wherein said photocathode has a characteristic pixel size, said predetermined range of wave lengths includes wave lengths of about 6000 A (0.6 microns), said aperture means includes an opaque screen having an aperture containing a viewing lens positioned at said focus point for focussing light from said scintillator approximately to a point on said photocathode, and said aperture is approximately an order of magnitude greater than said pixel size.

18. An anti-parallax method for viewing a light emitting face of a scintillator used to detect ionizing radiation from a source radiating conically with respect to an irradiated face of the scintillator, the conical flux of radiation defining a solid angle at the irradiated face, the method comprising the steps of:

providing an aperture reference point substantially optically conjugate to the vertex of the cone defined by the conical flux of radiation, providing a light transmitting aperture having a boundary surrounding an area including said aperture reference point, focussing substantially at said aperture reference point light rays from the light emitting face having direction from said vertex, sensing said light transmitted by said aperture, and displaying an image responsive to said sensing, said optically conjugate relationship being uncertain within a predetermined tolerance, predetermining an aperture size, predetermining a pixel size for said sensing said light, predetermining a minimum detectable contrast between adjacent pixels, predetermining a viewing distance from said aperture for said sensing, and predetermining a resolving time, said pixel size, said contrast, said viewing distance and said resolving time making the resolution of said image parallax-limited by the tolerance of said optically conjugate relationship.

19. A scintillator imaging system for imaging penetrating ionizing radiation from a source, comprising:

scintillation means for providing light having a predetermined range of wave lengths in response to the radiation, said scintillation means having an irradiated surface, said source being sized and disposed to provide no more than a preselected minimum unsharpness and radiate said surface conically, the vertex of the radiation flux cone defining an equivalent point source of radiation radiation said surface;

anti-parallax imaging means for focusing said light from said scintillation means, said anti-parallax imaging means providing a focus point, said point source and said focus point being optically conjugate with each other with respect to said anti-parallax imaging means, said anti-parallax imaging means including a plurality of mirrors arranged in a quasi-Newtonian configuration; and viewing means having an inherent best spatial resolution for receiving and intensifying the transmitted light, and for displaying an image responsive to said transmitted light.

* * * * *